United States Patent [19]

Dixon

[11] 4,078,650
[45] Mar. 14, 1978

[54] ROTATABLE DRUM FOR FEEDING SMALL PARTS

[75] Inventor: Paul H. Dixon, Belvidere, Ill.

[73] Assignee: Dixon Automatic Tool, Inc., Rockford, Ill.

[21] Appl. No.: 741,290

[22] Filed: Nov. 11, 1976

[51] Int. Cl.² .................. B65G 47/84; B65G 29/00
[52] U.S. Cl. ................................ 198/397; 198/559; 198/713; 221/241; 37/189
[58] Field of Search ............. 198/393, 397, 443, 559, 198/616, 713, 714; 221/241; 222/307, 308; 37/91, 189

[56] References Cited

U.S. PATENT DOCUMENTS

| 3,552,539 | 1/1971 | Rutter | 198/397 |
| 3,675,302 | 7/1972 | Dixon | 29/211 |
| 3,724,648 | 4/1973 | Schaller | 221/241 |

FOREIGN PATENT DOCUMENTS

| 1,435,986 | 5/1976 | United Kingdom | 198/397 |

Primary Examiner—Evon C. Blunk
Assistant Examiner—Jeffrey V. Nase
Attorney, Agent, or Firm—Leydig, Voit, Osann, Mayer & Holt, Ltd.

[57] ABSTRACT

Threaded fasteners in a hopper are picked up by buckets spaced angularly within a rotatable, open sided drum and are dumped out of the buckets at a position above the hopper. Each bucket is generally L-shaped and is formed by two elements, one of the elements being selectively adjustable relative to the other element to enable the effective volume of the bucket to be changed.

3 Claims, 5 Drawing Figures

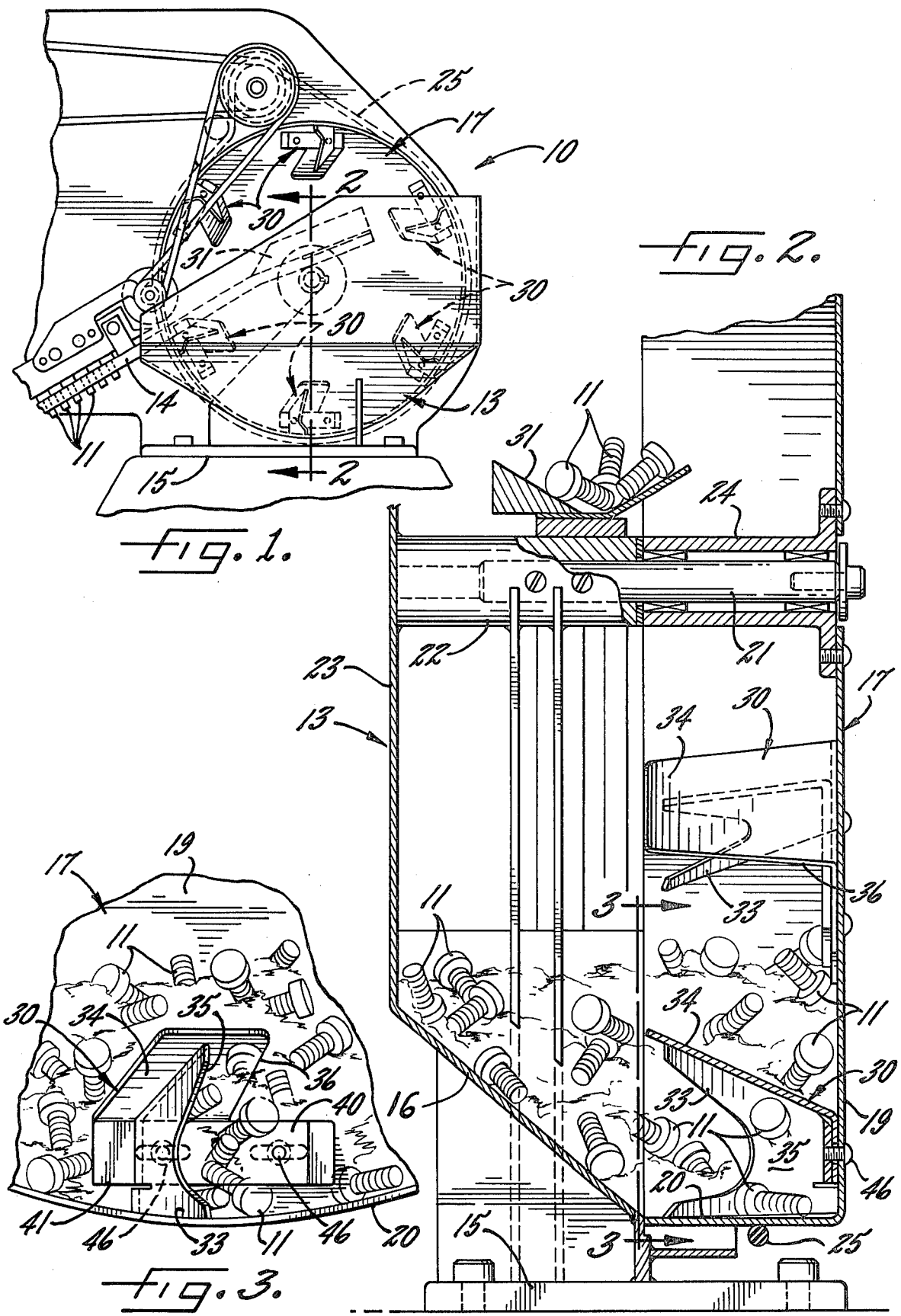
U.S. Patent   March 14, 1978   Sheet 1 of 2   4,078,650

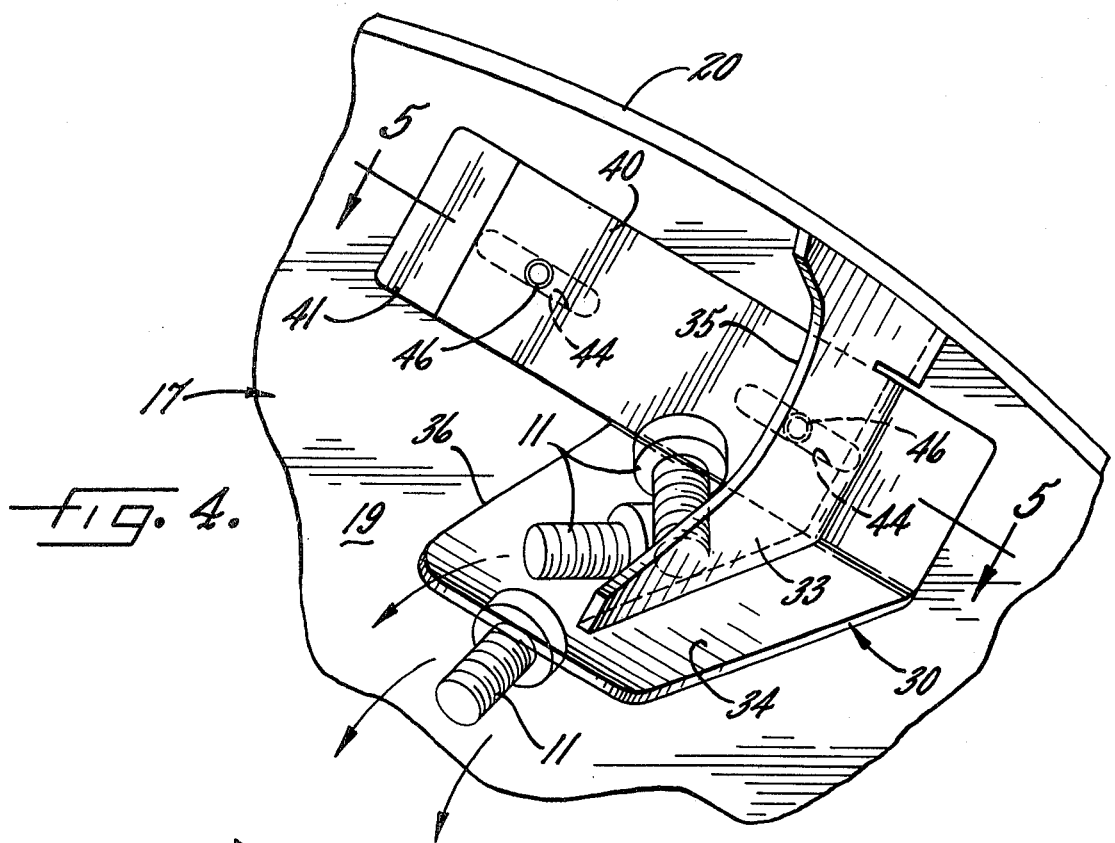
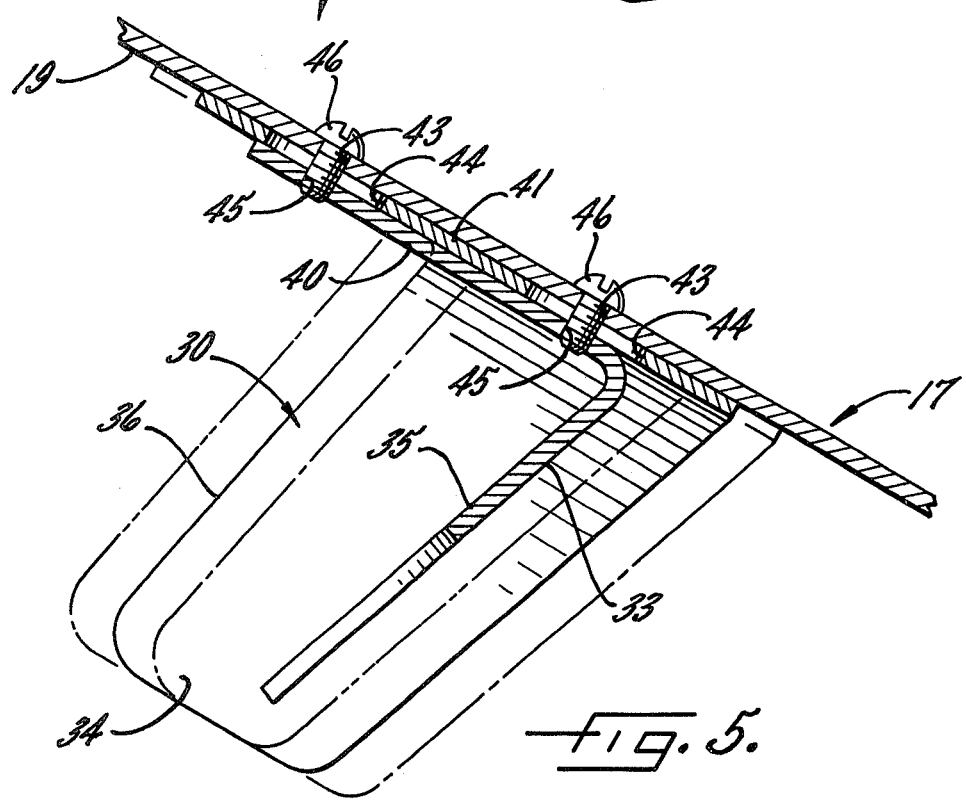

ROTATABLE DRUM FOR FEEDING SMALL PARTS

BACKGROUND OF THE INVENTION

This invention relates to apparatus for transferring small parts such as threaded fasteners. More particularly, the invention relates to apparatus of the type in which fasteners or the like are stored in an upwardly opening hopper and are adapted to be picked up by buckets spaced angularly around the inside of an open sided drum. When the drum is rotated, each bucket first moves past the hopper to pick up a quantity of fasteners and, after carrying the fasteners upwardly, spills the fasteners onto a device which, for example, may convey the fasteners to an automatic assembling mechanism. Apparatus of this general type is disclosed in my U.S. Pat. No. 3,675,302.

SUMMARY OF THE INVENTION

The primary aim of the present invention is to provide new and improved transfer apparatus of the above character in which the effective volume of each bucket may be easily adjusted so as to enable the bucket to pick up the proper number of fasteners and to enable the bucket to be adjusted to carry fasteners of different sizes.

A more detailed object is to achieve the foregoing by providing a substantially L-shaped bucket formed by a scoop element and a tray element, one of the elements being adjustable relative to the other element to enable the effective volume of the scoop to be changed.

The invention also resides in the unique shape of the scoop and the tray and in the novel manner of attaching the scoop and tray to the drum.

These and other objects and advantages of the invention will become more apparent from the following detailed description when taken in conjunction with the accompanying drawings.

BRIEF DESCRIPTION OF THE DRAWINGS

FIG. 1 is a fragmentary side elevation of new and improved parts feeding apparatus incorporating the unique features of the present invention.

FIG. 2 is an enlarged fragmentary cross-section taken substantially along the line 2—2 of FIG. 1.

FIG. 3 is a fragmentary cross-section taken substantially along the line 3—3 of FIG. 2.

FIG. 4 is a fragmentary perspective view showing part of the drum and one of the buckets.

FIG. 5 is a fragmentary cross-section taken substantially along the line 5—5 of FIG. 4.

DETAILED DESCRIPTION OF THE PREFERRED EMBODIMENT

As shown in the drawings for purposes of illustration, the invention is embodied in apparatus 10 for transferring parts such as threaded fasteners 11 from a supply hopper 13 to a device such as a track 14 from where the fasteners may be fed one-by-one to an automatic assembly mechanism (not shown). An exemplary assembly mechanism is disclosed in my aforementioned patent to which reference may be had for an explanation of the construction and operation of the assembly mechanism itself.

Herein, the supply hopper 13 is mounted on a main support or base 15 and is open at its top and at its inner side. The bottom wall 16 (FIG. 2) of the hopper is inclined downwardly and laterally toward an open sided drum 17 which is supported to rotate about a horizontal axis. The drum is formed by an upright disc 19 (FIGS. 2 and 3) and by a circular ring 20 which is joined to and projects axially from one side of the disc. A horizontal shaft 21 is attached to a hub 22 on the upright wall 23 of the hopper and projects rotatably through a bearing assembly 24 attached to the center of the disc, the drum thereby being supported for rotation. Trained around the ring 20 is a power driven belt 25 (FIGS. 1 and 2) which is operable to rotate the drum slowly in a counterclockwise direction.

Spaced angularly around the drum 17 adjacent the inner side of the ring 20 are several buckets 30. When the drum is rotated, the buckets move successively past the hopper 13 and scoop up fasteners 11 which gravitate down the bottom wall 16 of the hopper and into the open side of the drum. The buckets then move upwardly above the hopper and, with continued turning of the drum, spill the fasteners into a chute 31 which leads downwardly to the feed track 14. The chute is located in a stationary position just above the center of the drum while the track extends alongside the drum and beneath the lower end of the chute.

In accordance with the present invention, each of the buckets 30 is substantially L-shaped and is formed by two elements 33 and 34 which may be relatively adjusted to enable the effective volume of the bucket to be changed. Thus, if the hopper 13 contains comparatively large fasteners 11, the effective volume of each bucket 30 may be increased to enable a relatively large number of fasteners to be scooped up by the bucket. If the fasteners are small, the effective volume of each bucket may be reduced so that the bucket will not scoop up so many fasteners as to overload the track 14.

More particularly, the elements 33 and 34 of each bucket 30 are formed by a pick up scoop and a discharge tray, respectively. Each scoop 33 is made of a substantially flat piece of sheet metal and projects inwardly from the inner side of the ring 20, the scoop extending in a substantially radial direction. Thus, the leading surface 35 (FIG. 2) of each scoop 33 faces in a generally circumferential direction and defines a pick up surface which sweeps through the fasteners 11 gravitating from the hopper 13, picks up a quantity of such fasteners and then carries the fasteners upwardly and around toward a position above the chute 31.

The tray 34 of each bucket 30 also is made from a substantially flat piece of sheet metal and is in the form of a blade which projects axially and downwardly from the disc 19 when the bucket is located above the chute 31. Each tray 34 extends alongside the inboard edge of its associated scoop 33 and includes a leading edge 36 (FIGS. 3 and 4) which is disposed in leading relationship to the leading pick up surface 35 of the scoop. As the scoop 33 moves upwardly from the hopper 13 the tray 34 helps retain the fasteners 11 picked up by the scoop (see FIG. 3). As the drum 17 continues to move to turn the scoop 33, the fasteners in the scoop spill over into the tray 34 and then slide downwardly out of the tray and into the chute 31 (see FIG. 4).

In keeping with the invention, the scoop 33 and the tray 34 of each bucket 30 are mounted for relative adjustment so that the distance between the pick up surface 35 of the scoop and the leading edge 36 of the tray may be changed to increase or decrease the effective volume of the bucket. For this purpose, the scoop 33 is formed with a flat elongated mounting flange 40 (FIG.

5) which projects away from the pick up surface 35 while the tray 34 is formed with a similar mounting flange 41 which is disposed in face-to-face relation with the flange 40. The flange 41 is sandwiched between the flange 40 and the disc 19 and is disposed in face-to-face relation with the disc.

Two holes 43 (FIG. 5) are formed through the disc 19 and are alined with elongated slots 44 formed in the mounting flange 41 of the tray 34 and with threaded holes 45 formed in the mounting flange 40 of the scoop 33. Threaded fasteners in the form of screws 46 extend through the holes 43 and the slots 44 and are threaded into the holes 45. When the screws are tightened, the flange 40 is drawn against and clamped to the flange 41 and clamps the latter to the disc 19. By loosening the screws, the tray 34 may be adjusted so as to position its leading edge 36 either nearer to or farther away from the pick up surface 35 of the scoop 33 (see FIG. 5), the slots 44 being elongated along the length of the flange 41 and extending generally circumferentially of the drum so as to permit such adjustment.

When the tray 34 is adjusted so as to position its leading edge 36 further away from the pick up surface 35 of the scoop 33, the effective volume of the bucket 30 is increased and thus the bucket will hold more fasteners 11 of a given size. Conversely, reverse adjustment of the tray 34 reduces the effective volume of the bucket so that the latter will scoop up and retain fewer fasteners of a given size. Accordingly, the volume of each bucket may be adjusted in accordance with the size of the fasteners being handled and the speed of operation of the assembly mechanism so as to insure that fasteners are spilled onto the track 14 in sufficient quantity as to adequately service the assembly mechanism without overloading and jamming the track with too many fasteners.

I claim:

1. Apparatus for transferring small parts, said apparatus comprising a support, a hopper on said support and containing a supply of said parts, a drum mounted on said support to rotate about a substantially horizontal axis with the lower portion of said drum moving past said hopper during rotation of the drum, one side of said drum being formed by an upright disc and the opposite side of said drum being open, a circular ring joined to and projecting axially from said disc, and a plurality of buckets spaced angularly around the inner side of said ring with each bucket being operable to pick up parts in said hopper upon being moved past the hopper and to dump such parts after being moved upwardly from the hopper, said apparatus being characterized in that each of said buckets is substantially L-shaped and each is formed by two separate pieces, namely, a pick up scoop and a discharge tray, said scoop projecting inwardly from the inner side of said ring and having a substantially circumferentially facing pick up surface, said tray projecting generally axially from said disc alongside the inner edge of said scoop and having a leading edge disposed in leading relationship to said pick up surface, and means supporting said tray for selective adjustment in a generally circumferential direction along and relative to the inner edge of said scoop to enable changing of the circumferential distance between said leading edge of said tray and said pick up surface of said scoop and thereby enable changing of the effective volume of said bucket.

2. Apparatus as defined in claim 1 in which said tray includes a mounting flange disposed in face-to-face relationship with said disc, said means comprising threaded fasteners extending through said disc and said mounting flange, and elongated slots formed through one of said mounting flange and said disc and receiving said fasteners to permit adjustment of said tray relative to said disc.

3. Apparatus as defined in claim 1 in which said scoop and said tray include first and second mounting flanges, respectively, disposed in face-to-face relationship, said second mounting flange being sandwiched between said first mounting flange and said disc and being disposed in face-to-face relationship with said disc, said means including elongated slots formed in said second mounting flange, and threaded fasteners extending through said disc and said slots and threaded into said first mounting flange to attach said scoop and said tray to said disc, and slots permitting adjustment of said tray relative to said scoop and said disc when said fasteners are loosened.

* * * * *